Nov. 10, 1970     L. L. KESSLER     3,539,820
REAL LOAD UNBALANCE PROTECTION CIRCUIT FOR ALTERNATING
CURRENT POWER SOURCES CONNECTED FOR PARALLEL OPERATION
Filed Jan. 10, 1968

WITNESSES:
Bernard R. Grégua
E. Strickland

INVENTOR
Leland L. Kessler
BY F. P. Lyle
ATTORNEY

United States Patent Office 3,539,820
Patented Nov. 10, 1970

3,539,820
REAL LOAD UNBALANCE PROTECTION CIRCUIT FOR ALTERNATING CURRENT POWER SOURCES CONNECTED FOR PARALLEL OPERATION
Leland L. Kessler, Lima, Ohio, assignor to Westinghouse Electric Corporation, Pittsburgh, Pa., a corporation of Pennsylvania
Filed Jan. 10, 1968, Ser. No. 696,756
Int. Cl. H02j 3/46
U.S. Cl. 307—87                               6 Claims

ABSTRACT OF THE DISCLOSURE

The invention comprises a simple unbalanced load detection circuit for effecting operating control or isolation of a faulted alternating current power source connected in parallel operation with a plurality of such sources when the faulted source fails to divide real load evenly with the other sources in an AC power system. The detection circuit comprises an inexpensive frequency sensing circuit which includes a simple voltage detector. The sensing circuit is biased by a voltage differential produced by an unbalanced load condition resulting from the faulted power source supplying more or less than its proper share of load current; when the unbalanced load condition reaches a predetermined level the detector operates to produce an output voltage which may be employed to effect removal of the faulted source from the system or to govern the prime mover of the faulted source.

BACKGROUND OF THE INVENTION

Figure 1:
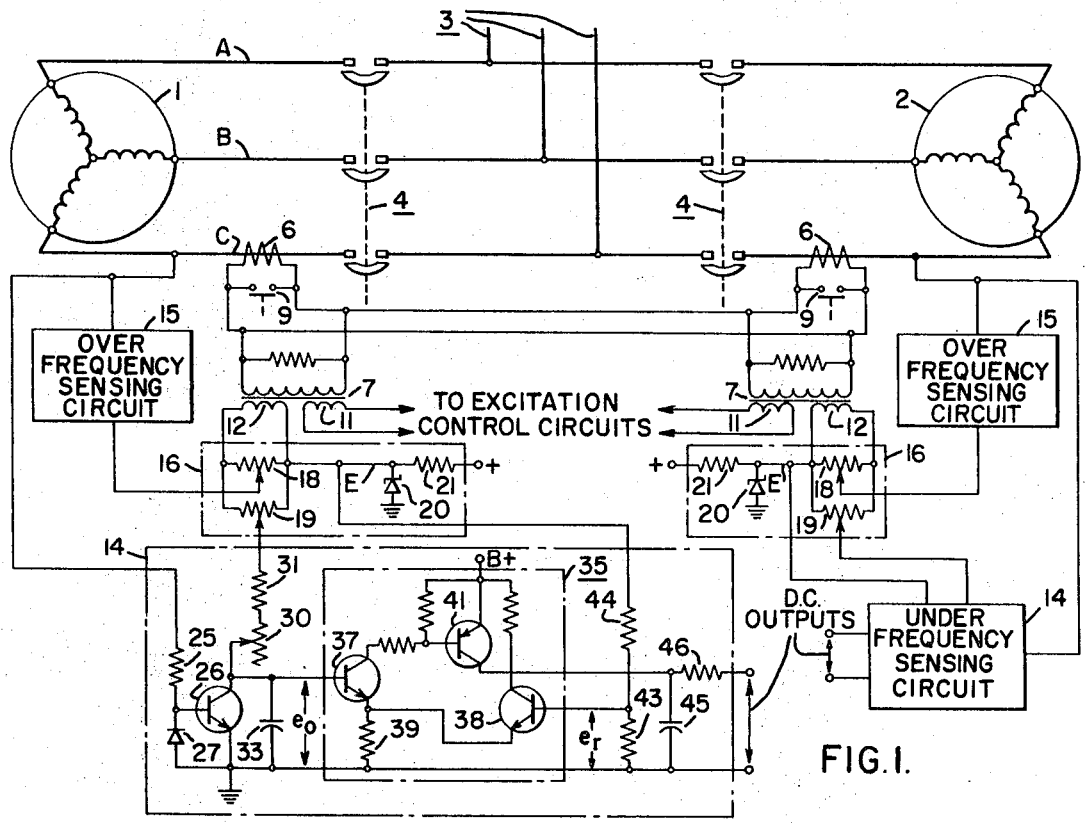

The present invention relates to the detection of unbalanced load conditions in alternating current power systems having a plurality of power sources operating in parallel, and particularly to a load division sensing circuit for detecting unbalance of real load in such systems.

In alternating current power systems having two or more generators or other power sources operating in parallel, means must be provided for maintaining proper division of both real and reactive load between the sources, and for providing protection against sustained unbalance of real or reactive load. In a generator system, division of reactive load is determined by generator excitation, whereas division of real load between generators, and thus proper division of load between their prime movers, can be maintained by proper control of the prime movers.

In multigenerator power systems, an equalizing circuit is usually provided which functions to provide real power output between the generators. The circuit controls the generators by controlling operation of the throttles on the prime movers. In certain types of systems, the generators are rigidly coupled to their respective prime movers without the use of a free running clutch so that the output frequencies of the generators are directly related to the speed of the prime movers, and no mechanical means exist for disengaging the prime movers from the generators. Should a fault occur on one of the generators which causes the throttle on the associated prime mover to change the speed of the prime mover and generator, or if the prime mover depletes its fuel supply, the generator will deliver more or less (depending upon the direction of speed change) or none of its share of the real load. The real power equalizer circuit senses a deficiency of real power from the unfaulted generators when the faulted generator increases speed, and an excess of real power from the unfaulted generators when the faulted machine decreases speed or shuts down completely.

With the sensing of a deficiency or an excess of real power, the load equalizer circuit causes the prime movers of the unfaulted machines to respectively increase or decrease their speeds. Thus, system frequency is maintained at an above or below normal frequency with such a control means when a prime mover fault or failure occurs.

What is therefore needed is a means for selectively removing the faulted generator from the system and to allow the remaining generators to assume an equal share of the existing load at the normal operating frequency.

BRIEF SUMMARY OF THE INVENTION

The present invention meets this need with an inexpensive component addition to an already low cost frequency sensing circuit described in copending application Ser. No. 578,348 filed by Wendell Calfee on Sept. 9, 1966, and assigned to the present assignee.

As described in the copending application, the circuit comprises a timing capacitor connected across a voltage detector in the form of an integrated differential amplifier. The capacitor is further connected to be charged by a half cycle of one polarity of the terminal voltage of an alternating current power source. The voltage detector compares the level of charge representing the time period of the one polarity to a fixed time constant (a reference voltage) and operates to produce a control signal when the frequency of the power source rises above or drops below a predetermined value.

Generally, the frequency of each power source in a parallel connected system is sensed by an underfrequency detecting circuit and an overfrequency detecting circuit constructed substantially as described above and in the above mentioned copending application. In the present case, however, the operating limits of the sensing circuits are changed (biased) as a linear function of a real current differential occurring in a loop circuit when the sources fail to equally divide real load, the sources being connected to supply one per unit unity power factor load. A one per unit of differential real current will cause the per unit effective frequency sensed by the sensing circuits to change by a constant amount (a sensitivity constant), the amount depending upon circuit parameters to be more fully explained hereinafter. If the sensitivity constant of the above mentioned load equalizer circuit is the same as the sensing circuits, a fault on one or more of the parallel operated generators will cause the equalizer circuit to sense an excess or deficiency of real power and thereby seek a balanced condition by decreasing or increasing the speed of the unfaulted prime movers in accordance with a value equal to the per unit increase or decrease of real current supplied by the unfaulted generators times the sensitivity constant of the equalizer circuit. Thus, the effective frequency sensed by the frequency sensing circuits associated with the unfaulted generators is equal to system frequency, which is now changed by the faulted generator, plus or minus the bias (depending upon the direction of frequency change) produced as a result of the differential current, the bias functioning to return the effective sensed frequency of the unfaulted generators to the system frequency before the occasion of the fault.

The effective sensed frequency on the faulted generator is the system frequency, presently altered by the fault, plus or minus the original system frequency (depending on the direction of frequency change) multiplied by the sensitivity constant of the sensing circuit times the differential real current now being supplied or accepted by the faulted generator. If the under or overfrequency circuit is set to operate at a value above or below the effective sensed frequency on the faulted generator, the generator is removed from the system, the remaining generators functioning to supply an increased per unit current to the original per unit system load at the original system frequency.

THE DRAWINGS

Figure 2:
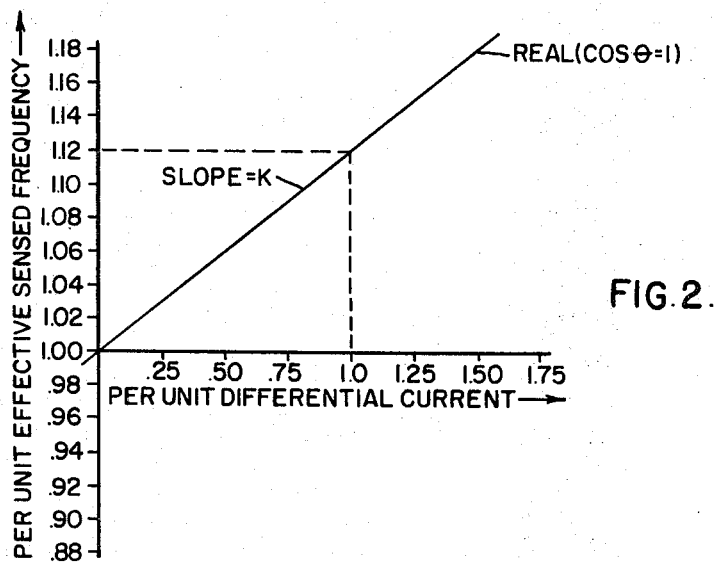

The objects and advantages of the invention will be more apparent from the following detailed description taken in connection with the accompanying drawing in which:

FIG. 1 is a schematic diagram of a real load unbalance sensing and protective circuit arrangement constructed in accordance with the principles of the invention; and FIG. 2 is a typical transfer curve showing the constant relationship between differential current and effective sensed frequency for a sensing circuit effective to measure frequency conditions in a real load dividing, multiple power source system.

PREFERRED EMBODIMENT

Specifically, there is shown in FIG. 1, a three-phase alternating current system having two three-phase generators 1 and 2 connected in parallel to a load bus 3 by circuit breakers 4. The generators 1 and 2 represent additional generators, or other types of alternating current power sources, connected in parallel to the load bus 3, only two generators being illustrated in FIG. 1 for purposes of simplifying the drawing. The generators are driven by individual prime movers (not shown), for example aircraft engines, though the invention is not limited thereto.

For the purpose of indicating unequal load division between the power sources 1 and 2, a current transformer 6 and a voltage transformer 7 are provided for each machine, for example as shown in U.S. Pat. 3,294,976 issued to Tipton et al. and assigned to the present assignee. The current transformers 6 are connected in corresponding phases, and are interconnected with additive polarity in a loop circuit with the voltage transformers 7 as shown in FIG. 1 and in the Tipton et al. patent.

Connected across each of the current transformers 6 is a set of normally open relay contacts 9 which operate to close when the associated generator is removed from the system.

In FIG. 1, the voltage transformers 7 are shown provided with two secondary windings 11 and 12, the windings 11 corresponding to the excitation control voltage windings shown and described in the Tipton et al. patent for effecting the balance of reactive load. The secondary winding 12, in the present disclosure, may be added to the already existing voltage transformer 7 to develop a real load differential control voltage though the invention is not limited thereto. A separate loop circuit may be employed to develop such a control voltage, though the simple addition of another secondary winding (winding 12) provides an inexpensive means for carrying out the purposes of the present invention.

In accordance with the invention, two frequency sensing circuits 14 and 15, and a control bias circuit 16 for the sensing circuits are provided for each generator, the circuits being responsive to the differential current developed in the current transformer loop circuit when the generators 1 and 2 fail to divide real load equally. The circuits 14 and 15 operate to provide signal outputs in response to the differential current of a preset value which signals can be employed to isolate a faulted generator, to control the speed of the faulted generator's prime mover, or to provide an indication of a faulted generator or prime mover.

The circuits 14 and 15 are respectively underfrequency and overfrequency sensing circuits (or vice versa) which are substantially identical in construction and operation. For this reason only one sensing circuit (14) is shown in detail in FIG. 1.

The control bias circuit 16 includes the secondary winding 12 of the transformer 7, two variable resistors or potentiometers 18 and 19 connected in parallel across the winding 12, a Zener diode 20 and a resistor 21 connected to a source of direct current voltage.

The sensing circuits 14 and 15 are essentially the same as the circuit shown and described in the above-mentioned copending application. The circuit 14 is thus shown in FIG. 1 including a current limiting resistor 25 connected between a terminal of the generator 1 and the base of a transistor 26, and a diode 27 connected between the base and ground.

The collector of the transistor 26 is connected to the potentiometer 19 in the bias circuit 16 through series resistors 30 and 31, the resistor 30 being adjustable to set the operating limits of the circuit 14.

Across the transistor 26, and in series with the resistors 30 and 31, is connected a timing capacitor 33. The capacitor 33 is further connected across the input portion of a voltage detector generally designated 35 which may be a miniature integrated circuit as described in the above-mentioned copending application.

The voltage detector 35 comprises a differential amplifier comprising transistors 37 and 38 and a common emitter resistor 39, and a complementary NPN-PNP coupled output stage comprising a transistor 41 and associated resistors.

The voltage detector 35 is provided with a B+ voltage applied to the emitter of the transistor 41, and a direct current reference voltage $e_r$ applied to the base of the transistor 38 from a voltage divider means comprising resistors 43 and 44 connected between a regulated voltage point in the bias circuit 16 and ground.

The collector of the transistor 41 is connected to a capacitor 45 and a resistor 46, the capacitor and resistor producing a relatively smooth direct current output voltage when an underfrequency condition is sensed by the circuit 14.

In operation, the terminal voltage, or a voltage representative thereof, is applied to the base of the transistor 26 in the sensing circuit 14. The positive swing of the terminal voltage cycle is conducted to the base of the transistor which places the transistor in a current conducting state. The conducting transistor clamps the positive side of the capacitor 33 to ground so that little or no charge is allowed to collect in the capacitor.

During the negative swing of the cycle, current flows through the diode 27 so that no signal is applied to the base of the transisotr 26 thus causing it to turn off. The capacitor 33 is now free to charge with a flow of current between ground and the bias circuit 16, the regulated voltage provided by the bias circuit being applied to the capacitor 33 through the potentiometer 19 and the resistors 30 and 31. The level to which the capacitor 33 charges is inversely proportional to the frequency of the generator terminal voltage. The greater the frequency, the shorter the time period for charging and the smaller the voltage to which the capacitor can charge; conversely, a lower frequency allows more time for charging so that the voltage level attained across the capacitor is greater. This voltage, labeled $e_o$ in FIG. 1, is applied to the base of the transistor 37 in the voltage detector 35.

The detector circuit 35 is effective to produce or to discontinue an output voltage in response to the voltage $e_o$ reaching a predetermined, detectable level, the detectable level depending upon an under or overfrequency condition of a predetermined magnitude occurring in the power system supplied by the generators 1 and 2.

The voltage detector 35 operates in the following manner. When the frequency of the power source, generator 1 for example, is such that the level of the voltage $e_o$, which is a sensing voltage applied to the base of the transistor 37, is below the reference voltage lever $e_r$ applied to the base of the transistor 38, the transistor 38 conducts and produces a voltage across the common emitter resistor 39 which reverse biases the base-emitter junction of the transistor 37. Thus, the transistor 37 is in a nonconductive state so that no signal is applied to the base of the transistor 41, causing the transistor 41 to be in a nonconductive state with no output voltage appearing at the capacitor 45 and resistor 46.

When the frequency of the generator 1 decreases to a point where the sensing voltage $e_o$ is equal to or greater than the reference voltage $e_r$ the reverse bias on the transistor 37 is overcome so that it conducts thereby reverse biasing the transistor 38 with current flow through the common resistor 39. With the transistor 37 conducting, a base signal is applied to the transistor 41 causing its conduction and the appearance of output pulses on its collector terminal and lead for each occasion of $e_o$ equalling $e_r$. The capacitor 45 collects the output pulses, and with the resistor 46 produces a relatively smooth direct current output voltage which may be employed to operate protection devices, for example the circuit breakers 4 and relay contacts 9.

If the sensing circuit 14 and the voltage detector 35 are used to sense an overfrequency condition, the voltage detector would cease to produce an output voltage, and the absence of the output voltage would be used to effect operation of protection devices.

Under normal balanced conditions when each generator 1 and 2 is supplying its proper share of the total load, the current transformer 6 voltages are equal so that no current flows in the loop circuit which includes the primary windings of the voltage transformers 7. Under unbalanced conditions, however, when one generator is supplying more or less than its share of the total load, the current transformer voltages become unequal and a signal current proportional to the difference in load currents of the generators will flow in each of the transformers 7. The signal current may contain both real and reactive components, or it may consist only of one of the components, depending upon the nature of the unbalance. If the component is solely reactive, the secondary winding 11 develops a differential voltage which may be used to restore generator excitation balance as explained in the aforementioned Tipton et al. patent.

When a governor fault occurs which causes the throttle on the prime mover (driving one of the generators) to change its position, thereby causing the prime mover and generator to operate at a slower or faster rate, or when the fuel supply of one of the prime movers is depleted, real power unbalance exists. The real power equalizer circuit (not shown), associated with the prime movers, senses a deficiency of real power output from the other (unfaulted) generators if the fault causes an increase in the faulted generator speed, and an excess of real power from the unfaulted generators if the fault causes a decrease in the faulted generator speed or if the faulted generator stops altogether. The equalizer circuit then operates to alter the speeds of the unfaulted generators in the direction of the faulted generator speed to restore load balance at an increased or decreased speed and frequency.

In accordance with the invention, the faulted generator, the generator 1 for example, may be removed from the power system, and the remaining unfaulted generators permitted to assume equal division of the load at the currect system frequency wtih a minimum of inexpensive components. This is accomplished by the control bias circuit 16 working in combination with the loop circuit comprising the current transformers 6 and the primaries of the voltage transformers 7, and the frequency sensing circuits 14 and 15.

A shunt regulated directed current voltage E is produced in the bias circuit 16 by the Zener diode 20 and the resistor 21 which is connected to a source of direct current voltage (not shown). The direct current source may be provided from the rectified output of the generators 1 and 2 though invention is not limited thereto.

The regulated voltage E charges the frequency sensing capacitor 33 in the circuits 14 and 15 through the potentiometers 19 and 18 respectively and resistors 30 and 31 in the manner explained above. When a fault occurs on the generator 1 or 2 which causes its prime mover, and consequently the other prime mover, to change speed, the frequency sensing circuits 14 and 15 associated therewith sense frequency in accordance with the following equation:

$$F_{es} = F_{sy} + K\Delta I \cos \theta$$

where $F_{es}$ is the effective sensed frequency in Hz.
$F_{sy}$ is the system frequency in Hz.
$K$ is the sensitivity constant of the sensing circuits in Hz./amperes
$\Delta I$ is the difference between average of all the generator currents and the current of a given generator
$\theta$ is the angle by which the $\Delta I$ lags the generator terminal voltage.

The differential current $\Delta I$ appears in the loop circuit and a cross the voltage transformer, $\Delta I$ developing a differential voltage $\Delta E$ in the secondary winding 12 and across the potentiometers 18 and 19. The regulated voltage E which charges the capacitor 33 during negative swings of the generator output voltage cycle, is thereby altered by the differential voltage. If the differential voltage $\Delta E$ is in phase with the phase C voltage, which is applied to the base of the transistor 26, $\Delta E$ will subtract from the charging voltage E during the full half cycle. With the consequent reduction in the charging voltage E, the time period required for the frequency sensing capacitor 33 to charge increases thus making it appear as if the capacitor has not had time to fully charge though the actual frequency has not substantially changed. This apparent increase in frequency is the effective frequency $F_{es}$ sensed by the frequency sensing circuits 14 and 15.

If the $\Delta E$ developed across winding 12 of the transformer 7 adds to the charging voltage E, the capacitor 33 will charge at a faster rate thereby making it appear as if the sensed frequency has decreased since the capacitor now charges to a higher value for the same frequency.

If unbalanced reactive load is sensed, the one cycle average of $\Delta E$ is zero (i.e., $\Delta E$ neither adds to nor subtracts from the charging voltage E). Since the average charging voltage on the capacitor 33 remains unchanged, the effective sensed frequency is not altered.

Thus, $\Delta E$ functions as bias voltage on the sensing circuits 14 and 15 which changes the operating (frequency sensing) limits thereof as a linear function of $\Delta I \cos \theta$. In this manner, the bias circuit 16 frequency biases the frequency sensing circuits by voltage biasing said circuits to effect isolation or speed control of the faulted generator in a manner presently to be explained. The adjustable resistor 30, connected between the bias circuit and the sensing capacitor 33, is adjusted so that $e_o$ equals $e_r$ at a desired over or underfrequency level with $\Delta E$ being equal to zero.

For purposes of illustration, assume that four generators are connected to supply a one per unit unity power factor load and that the generators are provided with a load equalizer circuit having a sensitivity constant (the above defined K factor) equal to $$0.12 \frac{\text{per unit frequency}}{\text{per unit amperes}}$$

which is the same as that of the sensing arrangement depicted in FIG. 1. The curve of FIG. 2 shows a typical constant (K factor) relationship between per unit frequency and per unit differential real current. As indicated, a 1 per unit differential current will cause the per unit effective frequency sensed by circuits 14 and 15 to change from 1 to 1.12. Thus the K factor or sensitivity constant is $$0.12 \frac{\text{per unit frequency}}{\text{per unit amperes}}$$

Again, for purposes of illustration, the assumption is made that a fault occurs which limits the output of one of the generators of the hypothetical four generator system to 0.5 per unit unity power factor load. The equalizer circuit operating on the prime movers of the remaining three unfaulted generators senses an excess of real power and thus operates to lower the speed of the three prime movers to restore equal load division between the four generators.

To maintain the four per unit total load, the remaining three generators each supply 1.1666 per unit real current, the excess current being 0.1666 per unit of real current. The real load equalizer circuit causes a frequency decrease of K∆1 or 0.12 times the differential current (i.e., 0.1666 per unit of real current) which amounts to 0.2 of the original frequency. If the 1 per unit frequency is 400 Hz., the system frequency drops to (400–8) Hz. or 392 Hz.

The effective frequency ($F_{es}$) sensed by the frequency circuits 14 and 15 associated with the three unfaulted generators is the system frequency (now 392 Hz.) plus the 8 Hz. bias produced by the associated bias circuit 16. That is, the current flow (∆I) in the loop circuit resulting from the real load unbalance caused by the faulted generator produces a differential or bias voltage ∆E; this voltage adds to the regulated voltage E applied to the sensing capacitors 33 in the sensing circuits 14 and 15 associated with the three unfaulted generators which is effective to bias said circuits by 8 Hz. in a positive direction so that their effective sensed frequency is 400 Hz. which was the original system ($F_{sy}$) frequency. The frequency sensing circuits for the unfaulted generators therefore produce no output signal, with the effective frequency sensed being normal (400 Hz.), and the generators remain connected in the system.

The effective sensed frequency for the faulted generator is the system frequency (still 392 Hz.) minus the differential current existing between the faulted generator and the average of the unfaulted generators, which is 0.5 per unit load, as made in the above assumption. Thus, the effective sensed frequency for the faulted generator is 392 Hz.—.12 (.5) (400) which is equal to 368 Hz. If its underfrequency protection circuit 14 operates at 375 Hz., for example, the faulted generator is removed from the system by the resulting output signal from the circuit 14, the remaining three generators supplying 1.333 per unit current to the four per unit system load at the original system frequency of 400 Hz., the system frequency returning to normal with the removal of the faulted machine.

In a similar manner, if one generator is supplying more than its share of the real load, the system frequency will increase. The effective sensed frequency on the unfaulted sets will be biased back to the one per unit frequency while the effective sensed frequency of the faulted set will be biased upwards to an overfrequency trip limit of the sensing circuit 15 associated therewith.

It should now be apparent from the foregoing description that a new and useful protection circuit arrangement has been disclosed for a power system using a plurality of alternating current power sources connected for parallel operation. The circuit operates to isolate a faulted generator by sensing a real current differential when the power sources fail to divide real load equally. This real current differential is used to provide a bias voltage which changes the operating limits of over and underfrequency sensing circuits, the circuits being operative to produce output signals when the current differential and bias voltage reach a preset value. This is accomplished by an economical circuit, namely, a circuit comprising the simple addition of four components (potentiometers 18 and 19, Zener diode 20, and a resistor 21) and a transformer winding 12 to circuit arrangements already in use in parallel operated systems, for example, as shown in the above-mentioned Tipton et al. patent and the Calfee copending application.

Though the invention has been described with a certain degree of particularity, changes may be made therein without departing from the spirit and scope of the invention. For example, as mentioned above, the invention may be employed as a real load equalizer circuit to govern the prime movers of the generators 1 and 2.

What is claimed is:

1. In a system including polyphase alternating current power sources connected for parallel operation,
    means for producing a current signal proportional to the difference in load currents of the power sources,
    a circuit associated with each of the power sources for sensing the operating frequency of the system,
    means for deriving a voltage in response to the current signal,
    means for applying said voltage to said frequency sensing circuit to alter the operating limits thereof, said circuit being effective to produce an output signal when the current signal and operating frequency are at predetermined levels.

2. The system recited in claim 1 in which the frequency sensing circuit includes a timing capacitor,
    a direct current voltage for charging the capacitor,
    the voltage deriving means being electrically connected to alter the level of said charging voltage in an amount proportional to the difference in load currents of the power sources when the sources fail to divide real load equally,
    said altered voltage being effective to change the charging time of said timing capacitor and thereby change the operating limits of the frequency sensing circuit.

3. The system recited in claim 1 in which two frequency sensing circuits are provided for each of the power sources,
    said two frequency sensing circuits comprising an underfrequency sensing circuit and an overfrequency sensing circuit.

4. The system recited in claim 1 in which the frequency sensing circuit includes a voltage detector operative to produce the output signal.

5. A real load unbalance sensing and protection circuit for an electrical system in which at least two alternating current power sources are connected for parallel operation, said circuit comprising:
    means for producing a current signal proportional to the difference in load currents of the power sources,
    a circuit associated with each of the power sources for sensing the operating frequency of the electrical system,
    means for deriving a voltage in response to the current signal, and for applying said voltage to said frequency sensing circuit,
    said voltage being effective to bias said frequency sensing circuit and thereby alter its operating limits,
    said frequency sensing circuit being effective to produce an output signal when the current signal and operating frequency are at predetermined levels.

6. The circuit recited in claim 1 in which the frequency sensing circuit includes a voltage detector operative to produce the output signal.

References Cited

UNITED STATES PATENTS

| | | |
|---|---|---|
| 3,156,828 | 11/1964 | Hopper et al. |
| 3,248,609 | 4/1966 | Gambale _____ 307—87 X |
| 3,294,978 | 12/1966 | Billings et al. _____ 307—86 X |

ROBERT K. SCHAEFER, Primary Examiner

H. J. HOHAUSER, Assistant Examiner